United States Patent Office 3,325,248
Patented June 13, 1967

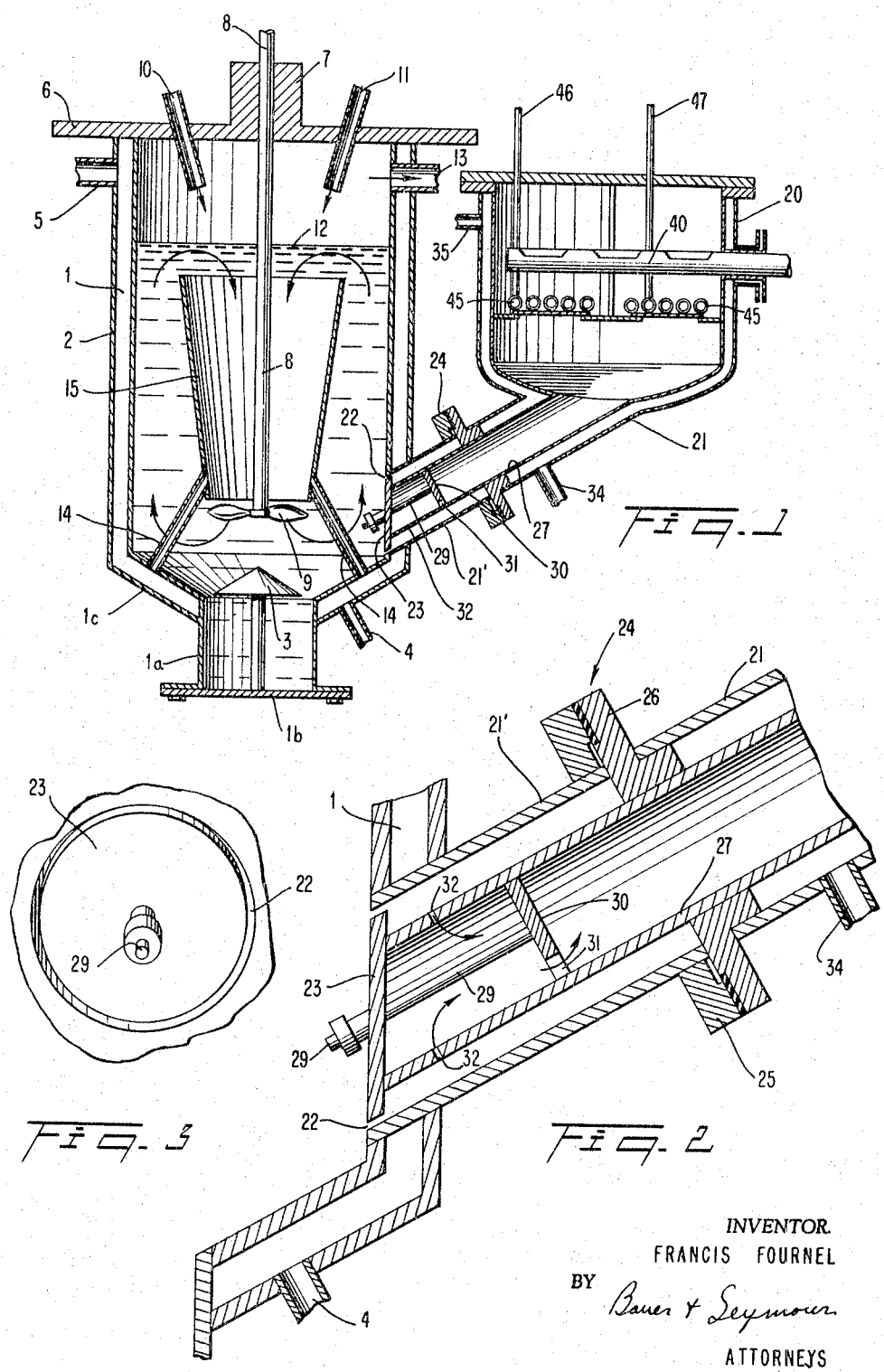

3,325,248
METHOD OF PREPARING SULFUR DIOXIDE
Francis Fournel, Paris, France, assignor to Compagnie de Saint-Gobain, Neuilly-sur-Seine, France
Original application Oct. 10, 1962, Ser. No. 229,579, now Patent No. 3,257,174, dated June 21, 1966. Divided and this application Dec. 7, 1965, Ser. No. 520,814
Claims priority, application France, Oct. 24, 1961, 876,870, Patent 1,311,317
4 Claims. (Cl. 23—177)

This application is a division of application Ser. No. 229,579, filed Oct. 10, 1962, now United States Patent No. 3,257,174, dated June 21, 1966, and partakes of the priority of French application Ser. No. 876,870 of Oct. 24, 1961.

This invention relates to an improved method of making sulfur dioxide by reacting sulfur with oleum. It is an object of the invention to make sulfur dioxide, either pure or mingled with minor percentages of $SO_3$. The $SO_3$ can be readily removed by a known process which is simple, readily controlled, and efficient.

Another object of the invention is to produce $SO_2$ from the reaction of sulfur with oleum by a continuous process which includes a novel method of removing unreacted sulfur from the depleted oleum and returning it to the reaction mass.

The objects of the invention are accomplished, generally speaking, by a method of making $SO_2$ which comprises reacting sulfur with oleum at a temperature above the melting point of sulfur, and recovering the $SO_2$ formed by the reaction.

According to one of the characteristics of the process, molten elementary sulfur is admitted to a reactor containing oleum which is kept at a temperature such that the sulfur does not solidify.

According to another characteristic of the invention, the reactor is continuously supplied with liquid sulfur and with oleum rich in $SO_3$ while an equal quantity of depleted oleum is segregated from the reaction mass for the extraction of the sulfur. The segregated oleum is thereafter withdrawn for renewed enrichment with $SO_3$ while the extracted sulfur returns directly to the reaction mass. Thus the process may be continuously operated using circulating oleum as the reaction medium.

According to another characteristic of the invention, the depleted oleum is segregated from the reaction mass and unreacted sulfur in suspension in the depleted oleum is solidified by cooling and is then melted to return to the reaction mass as droplets. The depleted oleum is continually withdrawn and the droplets of sulfur fall back to the main body of the reaction mass by gravity through the segregated and depleted oleum.

In practice, the sulfur is introduced as a liquid into the reactor at a temperature between 125 and 155° C., preferably between 135 and 145° C. It falls into the reaction mass which is at about 120° C. and is composed of oleum, liquid sulfur, and the products of their reaction. The $SO_2$ which is formed ascends and is released at the surface of the liquid to be withdrawn through a gas conduit provided for that purpose.

At the temperature of 120° the sulfur does not solidify but is dispersed as small droplets throughout the reaction mass by energetic agitation, reacting therein with the oleum to produce $SO_2$. A part of the reaction mass is segregated by passing into a decanter which is in communication with part of the reactor below the liquid level. In order that the reaction shall be stopped in the decanter, the decanter is maintained at a temperature slightly below that of the reactor but sufficiently high to prevent the sulfur from solidifying. The decanter is provided with a cold surface placed below the overflow which collects and solidifies the sulfur which does not settle out at the temperature of the decanter. This solid sulfur is melted from time to time by heating the cold body on which the solid sulfur has collected, thus forming droplets which settle and return to the main body of the reaction mass in the reactor.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a diagrammatic, vertical sectional view through a novel apparatus capable of carrying out the method;

FIG. 2 is an enlarged detail of the tube 21 in FIG. 1;

FIG. 3 is a face view of the baffle 23 taken from the left of FIG. 2; and

FIG. 4 is a modified form of novel apparatus.

Referring to FIGS. 1–3, the reaction vessel 1 has an encircling double-walled envelope 2 through which heating fluid can be passed from inlet 4 to outlet 5. The lower portion 1a of the reaction vessel is not jacketed for reason of simplicity of construction and is of materially reduced diameter. It is closed by a plate 1b which supports a baffle 3 of conical shape which cooperates with the section 1a, thus performing the function of deflecting descending currents toward the conical portion 1c of the vessel whence they are deflected upward, as shown by the arrows. The cover 6 is in tight sealing relation to the top of the vessel and is provided with a boss 7 through which passes the shaft 8 of an impeller 9 which can be driven to circulate the fluid in the vessel. The cover is also provided with ports 10 and 11 through which sulfur and oleum can be injected into the vessel. The liquid fills the vessel to a level 12 which is established by apparatus to be described. Above this liquid level there is an outlet 13 for gaseous products of the reaction which collect in the upper portion of the vessel. This reaction product is the $SO_2$, the preparation of which is desired, with some $SO_3$. The gases pass from pipe 13 to separating apparatus which is not a part of this invention and which is not shown.

Within the vessel, supports 14 fixed to the lower interior walls of the vessel carry an inverted frustrum of a cone 15, open at its upper and lower ends, of which the lower opening is adjacent the impeller 9. The operation of the impeller draws fluid down through the cone, projects it against the baffle 3 from whence it is deflected to the conical surfaces 1c and passes upward to enter the cone again, as shown by the arrows.

In the practice of the invention, the reaction mass will be kept at about 120° C., a convenient reacting temperature, the sulfur will be introduced at a temperature between 125° and 155° C., preferably above 135°, and the agitation will be as vigorous as is necessary for the efficient operation of the process. As the rates of admission of the reactants in a continuous flow process will depend upon the size of the reaction vessel, relative figures pertaining to this subject will be found in the examples.

A decanter 20 is attached to the reaction vessel by a tube 21 which extends at an angle which permits droplets of liquid sulfur to settle out and flow back toward the reaction vessel. The tube 21 is joined to the reaction vessel at 22, but this orifice is obstructed by a baffle 23. In actual manufacture, the reaction vessel is provided with a

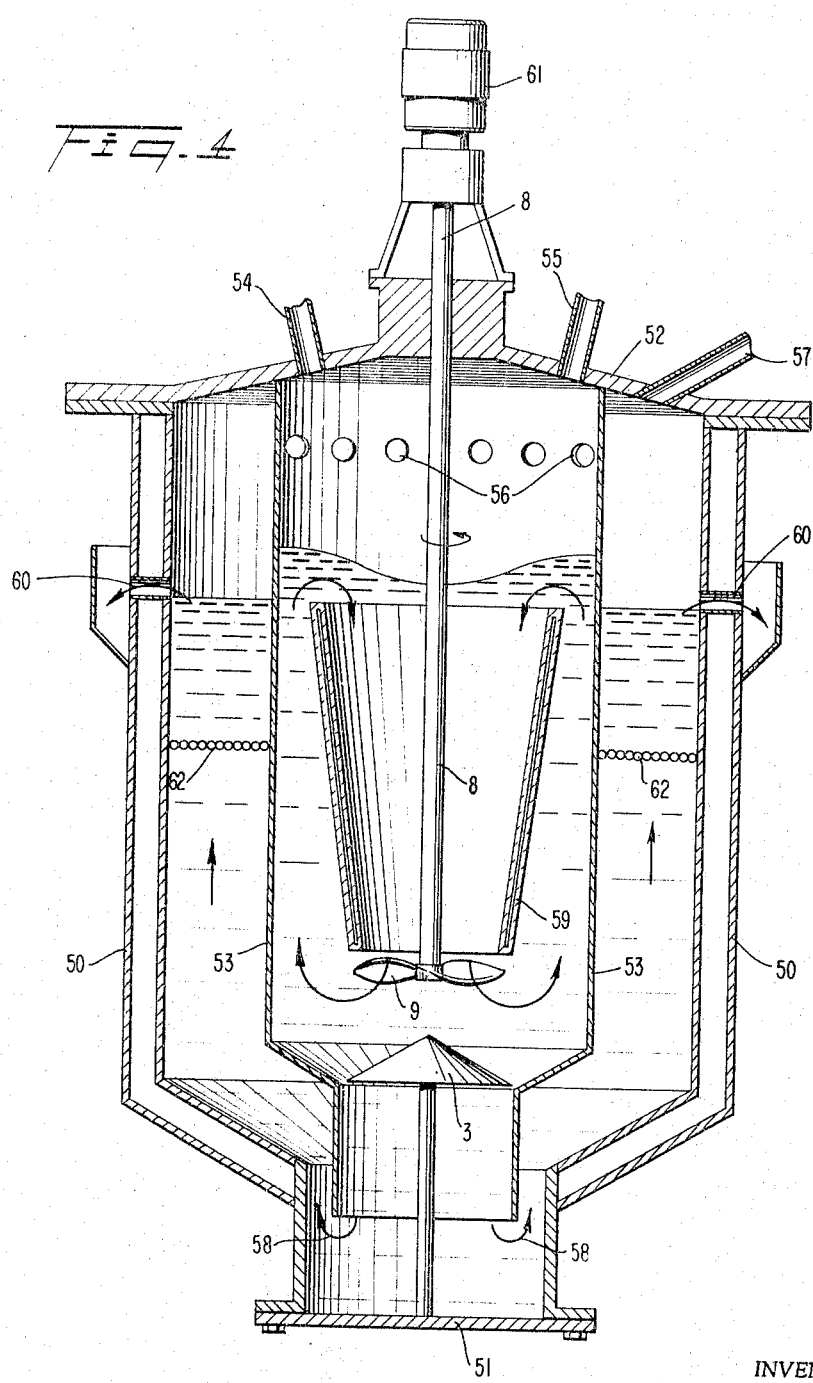

the sulfur, returning the liquid sulfur to the reaction mass, and isolating the withdrawn $SO_2$ from $SO_3$.

3. A method for making $SO_2$ which comprises maintaining at a temperature circa 120° C. a reaction mass containing liquid sulfur, oleum, and products of their reaction, admitting thereto oleum at about 120° C. and sulfur at about 125–155° C., and withdrawing $SO_2$ from above the reaction mass, and spent oleum from therebelow with a small amount of sulfur, and separating the sulfur from the spent oleum for recycling by chilling the spent oleum.

4. The method of making $SO_2$ which comprises maintaining a reaction mass containing liquid sulfur and oleum rich in $SO_3$ at a temperature circa 120° C., withdrawing $SO_2$ with some $SO_3$ from above the surface of the reaction mass, segregating oleum depleted in $SO_3$ from the main body of the reaction mass, cooling the segregated oleum to the temperature of solidification of sulfur and collecting the solidified sulfur, periodically heating said solidified sulfur to a liquid state and returning the same to the main body of the reaction mass, withdrawing said segregated oleum from the reaction cycle, and adding to the reaction mass fresh oleum at about 120° C. and fresh sulfur at about 125–155° C. as said segregated oleum is withdrawn.

References Cited

UNITED STATES PATENTS

| | | | |
|---|---|---|---|
| 1,896,483 | 2/1933 | Dohse | 23—177 |
| 2,813,007 | 11/1957 | Hall et al. | 23—177 |

FOREIGN PATENTS 1,194,380   6/1955   Germany.

OSCAR R. VERTIZ, *Primary Examiner.*

MILTON WEISSMAN, *Examiner.*

A. GREIF, *Assistant Examiner.*